United States Patent [19]

Hakimi et al.

[11] Patent Number: 5,315,365
[45] Date of Patent: May 24, 1994

[54] MACROBEND SPLICE LOSS TESTER FOR FIBER OPTIC SPLICES WITH SILICON GEL CUSHION ON OPTICAL COUPLING BLOCKS

[75] Inventors: Hosain Hakimi, Utica; Scott Bagetis, Cold Brook; Walter Williams, Newport; Howard Sins, West Leyden; Dennis Marolf, Oriskany, all of N.Y.

[73] Assignee: Laser Precision Corp., Utica, N.Y.

[21] Appl. No.: 899,880

[22] Filed: Jun. 17, 1992

[51] Int. Cl.⁵ .................. G01N 21/84; G01N 21/59
[52] U.S. Cl. ................................................ 356/73.1
[58] Field of Search ..................................... 356/73.1

[56] References Cited

U.S. PATENT DOCUMENTS

| | | | |
|---|---|---|---|
| 4,618,212 | 10/1986 | Ludington et al. | 356/73.1 X |
| 4,652,123 | 3/1987 | Neumann | 356/73.1 |
| 4,659,217 | 4/1987 | Shen et al. | 356/73.1 |
| 4,708,476 | 10/1987 | So et al. | 356/73.1 |
| 4,775,233 | 10/1988 | Kaneshi et al. | 356/73.1 |
| 5,078,489 | 1/1992 | Lieber | 356/73.1 |
| 5,127,724 | 7/1992 | James et al. | 356/73.1 |
| 5,159,399 | 10/1992 | Lieber et al. | 356/73.1 |
| 5,179,275 | 1/1993 | Lieber et al. | 356/73.1 |

*Primary Examiner*—Vincent P. McGraw
*Attorney, Agent, or Firm*—Harris Beach & Wilcox

[57] ABSTRACT

A splice loss tester for optical fiber splices has two light launch stations and a detection station. The light launch stations each have an optical coupling block formed of acrylic or other transparent material, with a concave surface on which an arcuate segment of the fiber is lightly biased by a cylindrical anvil. A photoemitter in optical contact with the coupling block generates light at a suitable wavelength (e.g. 1550 nm). A clear silicon gel layer on the block concave surface can hasten fiber stabilization. The detection station has a similar coupling block and anvil, and a pair of photodetectors to detect light leakage in each of two directions. The light is launched or detected over a substantial arc of the fiber, i.e., about ninety degrees, and the launch and detection units are useful over a wide range of wavelengths.

15 Claims, 3 Drawing Sheets

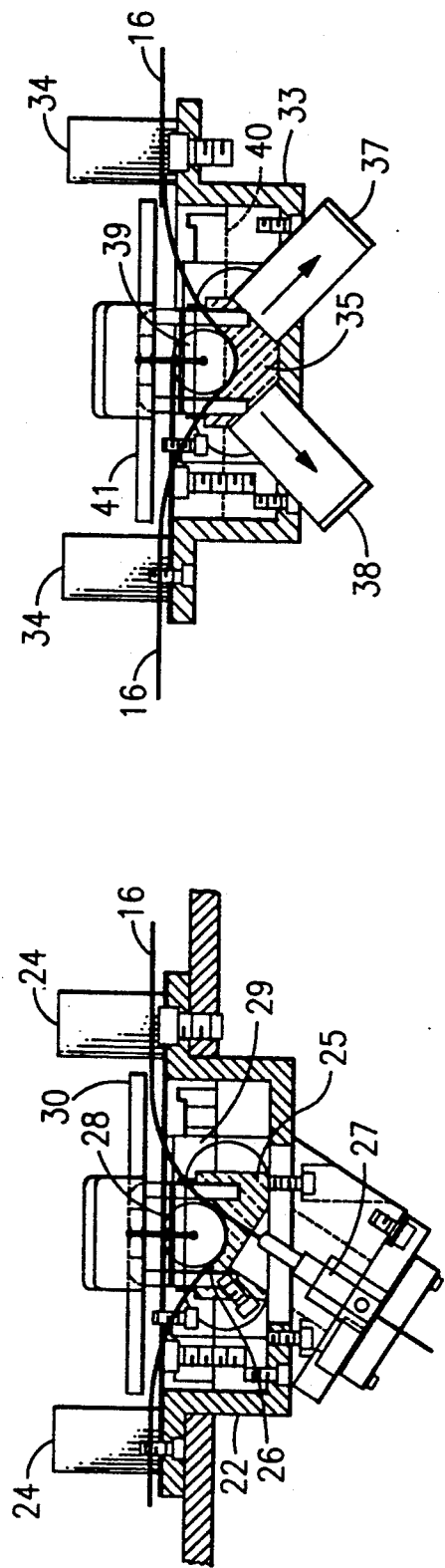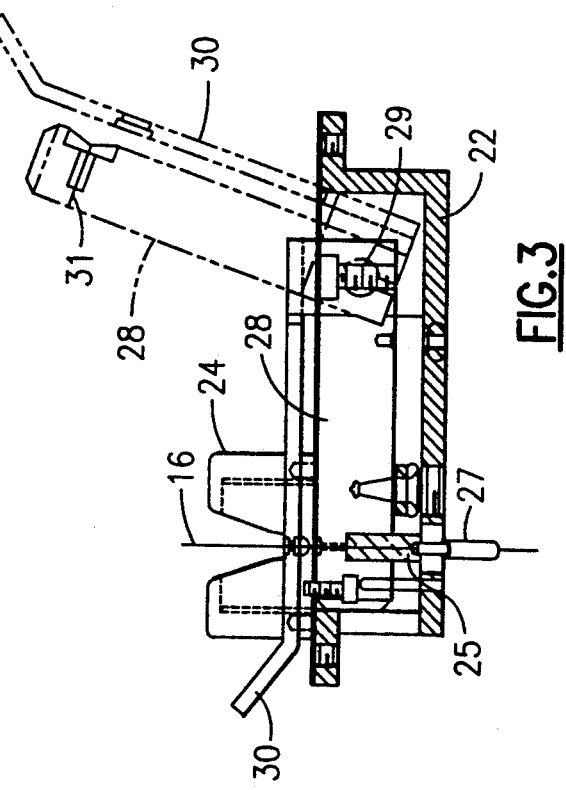

MACROBEND SPLICE LOSS TESTER FOR FIBER OPTIC SPLICES WITH SILICON GEL CUSHION ON OPTICAL COUPLING BLOCKS

BACKGROUND OF THE INVENTION

This invention relates to measurement of light lobs at a junction of two optical fibers, and is in particular concerned with testing the quality of splices in fiber communications systems.

At the present time, optical fibers are widely used for long-haul communications systems. In any given system, a long-distance fiber optic cable can consist of a number of fibers, each formed of several lengths of fiber joined end to end. In a given fiber there can be a number of splices separated from one another by a kilometer or more. Light is injected into each fiber at one end and a detector at the other end converts the information carried on the light into an electrical signal containing one or more channels. Each splice is a potential site of signal loss, and so the quality of the splices limits the quality and the distance for the communications system.

Splices can be fusion splices or mechanical splices. In a fusion splice the mating ends of the two fibers are cleaved and prepared so that their end surfaces are as square as possible. The fiber ends are manipulated on a jig so that the fibers are aligned on their x, y and z axes, and then the fibers are heat softened and fused together. The quality of the splice (i.e., the number of dB of loss) can be estimated by visual inspection of the fiber cores after fusion.

For a mechanical splice, the ends of the fibers are prepared, and are positioned in a V-groove in a splice coupler device. A matching oil (i.e. a clear fluid medium having the same retractive index as the optical fiber core) is applied at the junction of the fibers, and a cover or clamp is installed to hold the fibers securely in place. In this case, the positions of the fiber ends cannot be checked by visual inspection, so the amount of signal loss at the splices is inspected afterwards by analyzing light injected at one end of the fiber. This technique typically requires use of an optical time domain reflectometer (OTDR). This device is typically located at a site far from the location of the splice. Also, the OTDR is a rather expensive device, and requires considerable training for the operator. There have been several techniques proposed to inject light into the fiber on one side of a splice and extract light from the fiber on the other side of the splice, and from the measured light intensities compute the light loss at the splice.

A macrobending technique involves bending the fiber on each side of the splice, with each bend having a radius of curvature of 1 to 4 mm. Light is coupled from a focussed laser or LED source into a spot on the outside of the bend. With injectors of this type, −50 to −70 dBm of injection can be achieved, depending on the bend radius and light wavelength chosen. However, bending the fiber stresses it, typically at several times its proof stress limit, and can seriously compromise the long-term strength of the glass fiber. Tests have shown that fibers break in less than five minutes if the bend has a 1 mm radius. Consequently, macrobend light launchers employ bend radii of 4 mm or larger, which can achieve coupling factors of only −60 to −70 dBm at 1550 nm.

Microbend injectors do not impose such stress on the fibers, and thus impose less risk of fiber breakage. These devices typically distort the fiber by only about 0.1 micron along the fiber axis, and yet achieve a typical light launch efficiency of about −35 to 40 dBm at 1300 nm.

Microbend injectors bend the fiber over a small angle at one point, and impose a very small lateral distortion. These devices are tuned, that is, they are effective only at or near one given wavelength. If it is desired to inject light at another wavelength, the injector has to be entirely reconfigured for that wavelength.

In an evanescent microbend technique, the fiber is bent and is simultaneously impressed against the hypotenuse of a right-angle glass prism to cause microbending. This, in theory, provides about a 10 dB improvement over the macrobend injectors mentioned earlier. As tested, this type of device achieves an injection efficiency of −48 dBm at 1550 nm and −57 dBm at 1300 nm. This technique could also cause high stress.

Some previously proposed techniques as found in the patent literature include a macrobend technique as described in U.S. Pat. No. 4,618,212 (Ludington et al.) and a microbend technique as described in U.S. Pat. No. 4,652,123 (Neumann).

It has been desired to use a light injection system and light extraction system which have better efficiencies than those described above, and if possible at least −30 dBm, and preferably −20 dBM. However, the existing techniques could not reliably achieve these levels, thus limiting the ability to construct and use a field-developed splice tester for use in testing mechanical type splices.

OBJECTS AND SUMMARY OF THE INVENTION

It is an object of this invention to provide a splice tester which overcomes the drawbacks of the prior art.

It is another object to provide an improved light launcher unit and an improved light detection unit which employ an evanescent macrobending technique.

It is a further object to provide a tester which can test the quality of a splice to an accuracy of about 0.1 dB, and whose measurement accuracy is repeatably attainable.

According to an aspect of this invention an evanescent macrobend fiber optic splice tester tests the quality of a splice of either the fusion or mechanical variety.

First and second evanescent macrobend light launch units inject light at a predetermined wavelength (e.g. 1550 nm) into first and second fibers to travel in two respective directions towards the splice that joins them. As used here, the term "light" includes radiation outside the visible spectrum, including the infrared, as is commonly understood in this art. Each light launch unit includes an optical coupling block formed of acrylic, glass, or another transparent material with an index of refraction that substantially matches that of the fiber jacket. The coupling blocks have a concave surface with a launch portion thereof being substantially cylindrical. An anvil, which can be in the form of a pivoted swing arm, has a generally cylindrical surface that biases the respective fiber into an arc against the optical coupling block launch portion. A laser or an LED, serving as a light emitter, is disposed in optical contact with the block and sends light in a path that intersects the arc of the fiber. Preferably, the light intercepts the fiber at a low angle, but the part of the fiber where light contacts and enters the fiber continues for a sizable part of the arc, e.g. 120°.

A macrobend light detection unit is interposed between the first and second macrobend light launch units and detects the level of light reaching it through the fibers from each of the light launch units. This detecting unit has a detecting optical coupling block formed of a transparent material (e.g. acrylic) with a refractive index to match that of the optical fibers. The block has a concave detection portion which is substantially cylindrical over a central detection portion. An anvil member, which can be a pivoted swing arm, has a generally cylindrical surface that biases the fiber against the detection portion of the detecting block, where the fiber forms an arc in contact with the detection block. There are first and second light detecting elements, each in optical contact with the block, and each oriented so that its optic axis intersects the arc of the fiber, preferably at a low angle, and over a substantial angle of arc, e.g. 120°. The two detecting elements detect light that leaks from the fiber into the block at the bend, and the light intensity is proportional to the light travelling through the fiber.

A control circuit connects with the light launch units and the light detecting unit to control the injection of light and measure the relative light levels detected, and to compute the splice loss factor, either in absolute terms or in dB, based on the detected light levels.

In order to reduce settling time i.e., the time until the macrobend in the fiber yields a steady reading, a cushion layer can be included on the light launch portion of the light launch unit coupling blocks and on the detection portion of the detecting block. The cushion layer can be a clear silicon gel with substantially the same refractive index as the optical fiber. The gel tends to distribute stress uniformly, and so the fiber conforms rather quickly to the arcuate shape. The gel is also very easy to clean and maintain, as compared to a "wet" system in which a matching oil or other liquid medium would be used.

The device of this invention achieves high accuracy of reading, at least 0.1 dB for signal levels above −60 dBm and 0.25 dB for levels down to −70 dBm. The tester has a resolution of 0.01 dB over a range of 35 dB.

The entire test apparatus can be constructed as a portable unit, fitting into a case about thirteen inches by ten inches by six inches. The device weighs about ten pounds, and is powered by four rechargeable NiCad cells.

The detector unit can be employed separately for non-invasive signal detection or for communication. The light launch unit can also be used separately to inject a signal modulated on a light carrier onto a fiber. The light launch and detection units can also be used with an OTDR to couple the same into a fiber.

The above and many other objects, features, and advantages of this invention will present themselves to those of skill in the art from the ensuing description of a preferred embodiment, to be read in connection with the accompanying Drawing.

BRIEF DESCRIPTION OF THE DRAWING:

FIG. 2 is a sectional view of a light launch unit of FIG. 1.

FIG. 3 is another sectional view of the light launch unit, showing the anvil swing arm in raised and lowered positions.

FIG. 5 is a sectional view of the light launch detection unit of this embodiment.

Figure 1:
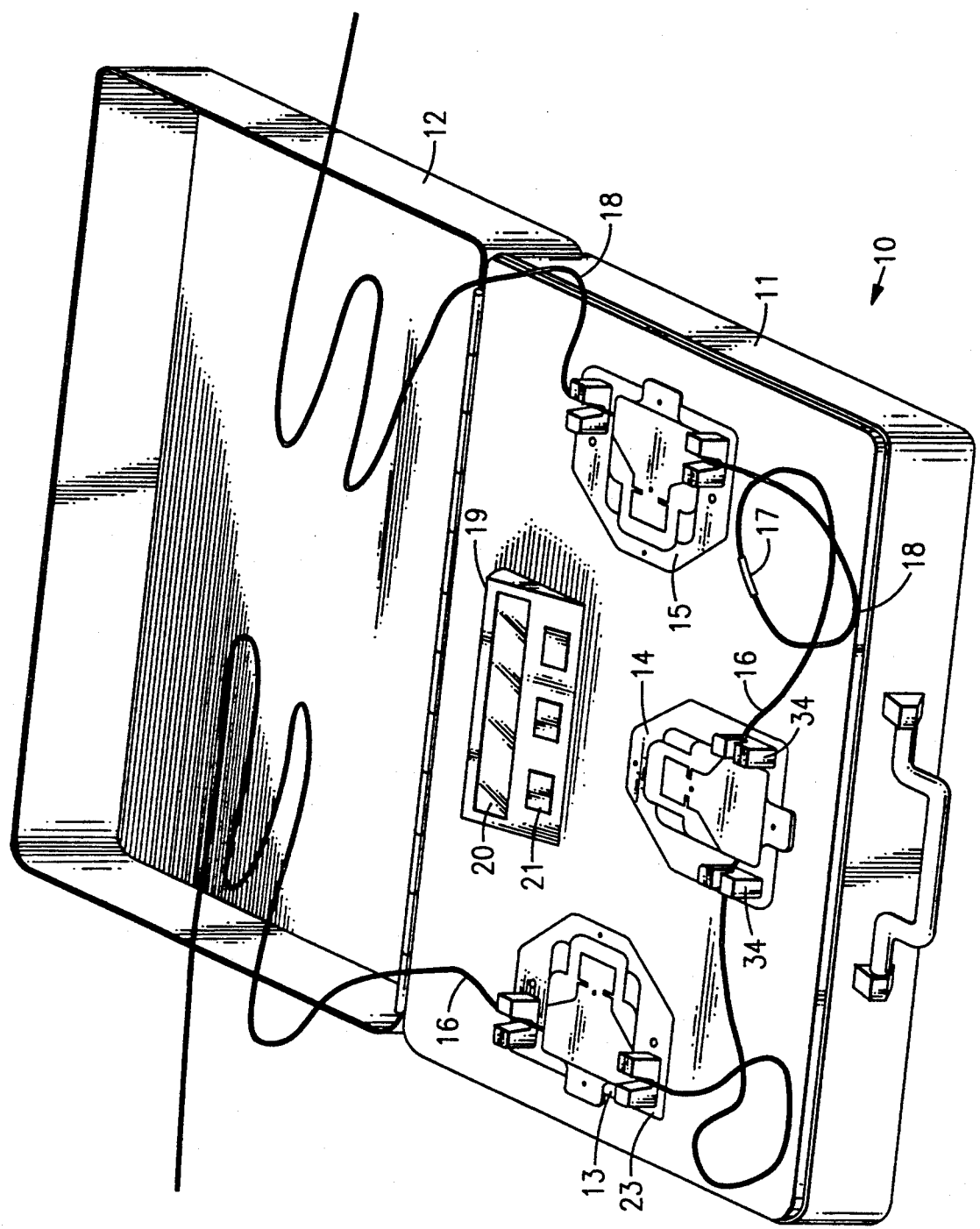
FIG. 1 is a perspective view of a splice loss tester according to one preferred embodiment of this invention.

DETAILED DESCRIPTION OF THE PREFERRED EMBODIMENT:

With reference to the Drawing, and initially to FIG. 1, a portable splice tester 10 is contained within a carrying case 11 having a closable lid 12. The tester 10 has a first light launch station 13 for launching light in one direction, a light detection station 14, and a second light launch station 15 for launching light in the other direction. A first optical fiber 16 is joined by a mechanical splice 17 to a second optical fiber 18. The fiber 16 passes through the first light launch station 13 while the second fiber 18 passes through the other light launch station 15. During a test, the light detection station 14 is clamped to the first fiber 16 and thereafter to the other fiber 18.

An electronic controller 19 is coupled to each of the light launch stations 13, 15 and to the detection station 14. The controller has a two-line LCD display 20, and a bank of switches 21 including an on/off switch, a test switch, and an optimize switch. The cable tray for the optical fibers can be positioned in the lid 12.

Figure 4:
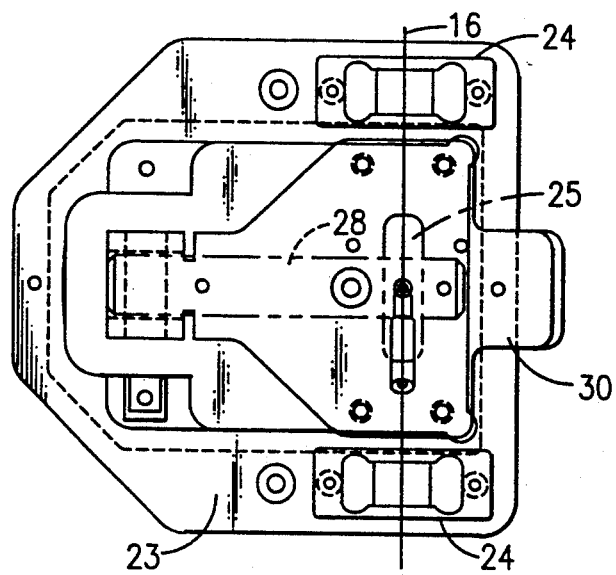
FIG. 4 is a top plan view of the light launch unit.

Details of the light launch station 13 are shown in FIGS. 2, 3, and 4. The second light launch station 15 is substantially identical, but mirror image, and it can be understood in connection with the same drawings.

A well 22 in the light launch station housing 23 contains a light launch mechanism to be described in detail shortly. Left and right fiber guides 24, each formed as a V-cut block, and positioned to either side of the well 22 serve to position the optical fiber 16 across an optical coupling block 25. Here, this block 25 is made at least partly of clear acrylic or a similar transparent material. The block material is selected to have an index or refraction very close to that of the optical fiber to facilitate transfer of radiation into the fiber. The optical coupling block has a concave surface 26 which is cylindrical at least over a central light launch region thereof. Typically, this surface has a radius of about five to six mm, but this is not critical. A photoemitter 27 is positioned in optical contact with the block 25 and is oriented so that the radiation that it generates intercepts this concave surface at a low angle. The photoemitter 27 can include a GaAs LED that generates infrared light with a wavelength of 1550 nm.

A movable anvil 28 swings up and down about a pivot 29 and serves to bias the optical fiber 16 into an arc that is positioned against the cylindrical light launch region of the optical coupling block 25. A flat cover plate 30 pivots up and down with the anvil 28, and serves to keep dust and stray light off of the optical coupling block 25. In this case, the anvil is cylindrical so that the profile of the portion that is oriented downward matches the cylindrical profile of the light launch region of the optical coupling block concave surface 26. An annular guide groove 31 around the anvil 28 serves to locate and position the fiber 16 against the coupling block 25. In this case, only a slight pressure is applied from the anvil 28 to hold the fiber 16 in contact against the coupling block 25. Unlike other macrobend or microbend techniques, it is neither necessary nor desirable to deform the fiber in cross section. Accordingly, there is less risk of fiber breakage with this technique than with the previous side-injection light launch techniques.

FIG. 5 is a cross section view of the light detection station 14. This station 14 is similar in its overall structure to the light launch station 13, but is adapted for receiving light, rather than transmitting, and also receives and detects light independently that passes through the fiber 16 in either direction. The light detection station 14 includes a housing 33 with left and right fiber guides 34 which help to locate and position the optical fiber, as shown in FIG. 1. In this case, there is an optical coupling block 35 formed of acrylic or similar clear transparent material, and with a generally cylindrical concave surface 36 in contact with an arcuate portion of the fiber 16. There is a first photodetector 37 in contact with the block and oriented so as to intercept light passing from the fiber to the block in one direction, and a second photodetector 38 on the other side of the block and oriented so as detect the light that passes from the fiber into the block in the other direction.

At the light launch station, there is a cylindrical anvil 39 which is raised and lowered about a pivot 40, and having a cover plate 41. While not shown in this drawing, the anvil 39 has an annular guide groove which is generally identical to that identified as groove 31 on the anvil 28, and which also serves to position the fiber 16 in an arc against the coupling block 35.

Each of the photodetectors 37 and 38 picks up the light from an arcuate portion of the fiber extending over an arc of about 120°.

Figure 6:
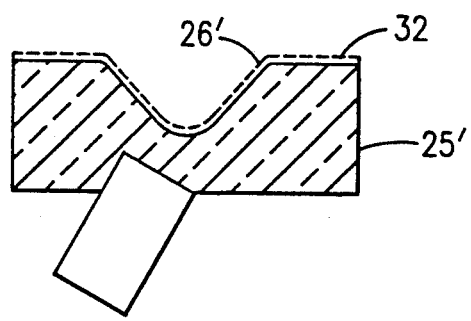
FIG. 6 shows an optical coupling block, e.g., of the light launch unit.

In an alternative embodiment, as shown in FIG. 6, the acrylic block 25' has its concave surface 26' covered with a clear silicon gel cushion layer 32. This layer 32 can typically be formed of a two part cured gel material, and can be rather thin. That is, no more than about 1 mm is necessary. In the case of the solid acrylic optical coupling blocks 25, 35 of the first embodiment, a settling time of 10 to 20 seconds is often required before reliable readings can be obtained from a fiber. The settling in period is required because stresses are imposed on the fiber due to bending and biasing against the block 25 or 35. However, where the silicon gel cushion layer is employed, the gel layer absorbs most of the stresses imposed on the fiber, and the settling time is reduced to 5 seconds or less.

In this case, the silicon gel 32 is also selected to have a refractive index that matches that of the optical fiber as closely as possible.

The detectors 38 and 37 are preferably germanium PIN diodes.

The controller 19 performs a number of computational functions and displays the results on the LCD display 20. These include loss data, actual power readings, in dBm, when in the optimize mode, prompts for installing the fibers 16, 18 in the launch stations 13, 15 and the detecting station 14 at appropriate times, indications of what measurement are being taken, threshold set data, pass/fail indication of splice quality, and factory test data.

Figure 7:
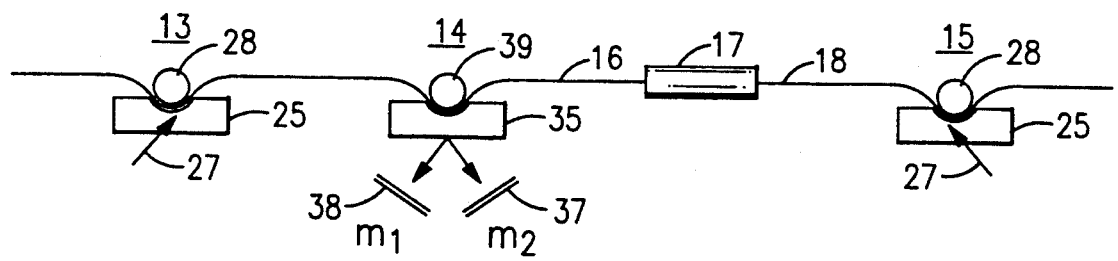
FIGS. 7 and 8 are schematic charts for explaining the splice test sequence using the splice loss tester of the present invention.
Figure 8:
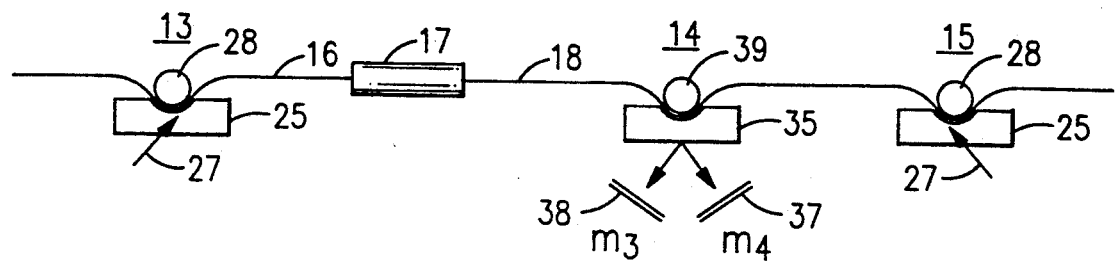

The optical fiber splice loss tester 10 can be employed in the test function as follows. As indicated in FIG. 7, an optical signal is injected into the fibers 16,18 by the 1550 nm photoemitters 27 at the two light launch stations 13 and 15. This injects the light in both directions, i.e., into fiber 16 in the direction towards the splice 17 and in the fiber 18 in the direction towards the splice 17. The photoemitters are respectively synchronized with respective photodetectors 37 and 38 and the output of the detector diodes is preamplified, rectified, and further filtered. This yields a dc signal which is proportional to the optical signal strength. The signal strength is converted into digital form and is then received and processed in the controller 19. After readings are obtained, a prompt is displayed on the LCD display 20 which directs the operator to unclamp the fiber 16 from the detecting station 14 and to insert the other fiber 18 into the detecting station 14, as shown in FIG. 8. Then, each of the light launch stations 13 and 15 is actuated, and the relative strengths of the light passing through the fiber in the two directions are measured by detecting the light at the photodetectors 37 and 38. These are converted to digital form for processing in the controller 19. The result is relative power strengths $R_1$ and $R_2$ from the first measurement (FIG. 7) and power strengths $R_3$ and $R_4$ from the second measurement (FIG. 8). After the second measurement, the controller analyzes the data, and runs a computation to obtain the light loss L at the splice 17, measured in db, that is, $$L = 5 \times \{(\log R_1 - \log R_2 - \log R_3 + \log R_4)\}$$

the result of this computation is a splice loss figure e.g., about 0.02 dB for an acceptable splice, which indicates the quality of the splice 17.

If, rather than the above test procedure, an optimization procedure is desired, the operator simply presses the OPT (optimize) button on the switch array 21. This initiates a routine which enables one light launch station 13 or the other, and switches to the corresponding detector 37 or 38. This procedure gives a continuous display of updated values of the light transmission between the light launch station 13 and the detecting station 14.

In order to make the splice loss tester portable, the controller 19 and the photoemitters and detectors are designed to operate on six volts dc, and power is supplied from four rechargeable NiCad cells. Also, to conserve battery, an automatic power-off routine is contained in the controller to shut down operations if the device is inactive for twenty minutes. The tester itself is light weight and portable, as well as being rugged and simple to use without needing prolonged operator training.

It should also be appreciated that the macrobend evanescent light launch devices and the macrobend evanescent light detector as incorporated into the splice loss tester, can be used likewise in other environments. For example, the light launch units can be employed for injecting a signal for communications purposes into an optical fiber. Also, the detector unit can also be used to tap into a fiber optic communications link without cutting the fiber. The detector unit can further be employed for detecting the presence or absence of signal, i.e., to detect whether a fiber is active or not, and to sense the direction of transmission.

In each case, with the macrobend evanescent technique, an efficiency of −35 dBm or better is easily achieved, and efficiencies of −20 dBm can be accomplished.

Also, unlike the microbend and microbend evanescent light launch and detecting techniques, the macrobend evanescent technique of this invention is relatively wavelength insensitive, and does not require reengineering of the coupling block and anvil for a change in color (i.e., wavelength) of the light.

While this invention has been described in detail with respect to a preferred embodiment, it should be understood that the invention is not limited to that precise embodiment. Rather, many modifications and variations would present themselves to those of skill in the art without departing from the scope and spirit of this invention, as defined in the appended claims.

What is claimed is:

1. Evanescent macrobend optic splice tester for testing the quality of a splice which joins first and second optical fibers which have a predetermined refractive index, comprising:

first and second macrobend light launch units for injecting light at a predetermined wavelength into said first and second fibers to travel in respective first and second directions towards said splice, each said macrobend light launch unit including an optical coupling block formed of a transparent material with a refractive index substantially the same as said fibers and having a launch portion with a substantially cylindrical surface, an anvil with a generally cylindrical surface biasing the respective fiber into an arc against the respective optical coupling block launch portion, and light emitting means in optical contact with said optical coupling block for injecting light at said predetermined wavelength in a direction to intersect the respective fiber in its arc thereon;

a macrobend light detection unit interposed between said first and second light launch units for detecting thereat the intensity of light from said first and second light launch units; including a detecting block formed of a transparent material with a refractive index substantially that of the optical fibers, and with a detecting portion having a cylindrical surface; an anvil member having a generally cylindrical surface which biases one of said first and second fibers into an arc against said detecting block cylindrical surface, and first and second light detecting elements in optical contact with said detecting block and having optical axes respectively oriented to intersect said arc to detect the level of light traveling through the fiber in said first and second directions and which emanates from the fiber biased therein; and control circuit means for controlling the light injecting means and receiving detected light levels from said first and second light detecting elements, and for computing splice loss occurring at the splice, based on said detected light levels, wherein said light launch units each contain a cushion layer of a clear silicon gel on said launch portion of said optical coupling block, and said detection unit includes a cushion layer of a clear silicon gel on said detecting portion of said detecting block.

2. The splice tester of claim 1 wherein each said anvil has a circumferential groove on its cylindrical surface for seating the respective optical fiber.

3. The splice tester of claim 1 wherein said predetermined wavelength is on the order of 1550 nm.

4. The splice tester of claim 1 wherein said silicon gel is selected to have a refractive index that substantially matches that of the optical fibers.

5. A macrobend light launch unit for injecting light at a predetermined wavelength into an optical fiber to travel along the fiber in one direction, comprising an optical coupling block formed of a transparent solid material with a refractive index substantially the same as said fiber and having a launch portion with a substantially cylindrical concave surface, an anvil with a generally cylindrical surface biasing the fiber into an arc against the optical coupling block launch portion, and light emitting means in optical contact with said optical coupling block for injecting light at said predetermined wavelength in a direction to intersect the respective fiber in its arc thereon, wherein said optical coupling block further includes a clear silicon gel layer on said concave cylindrical surface.

6. The macrobend light launch unit according to claim 5 wherein said optical coupling block is a clear plastic resin material.

7. The macrobend light launch unit according to claim 5 wherein said anvil includes a circumferential groove for accurately locating said fiber against the optical coupling block.

8. The macrobend light launch unit according to claim 5 wherein said light emitting means injects light along a path through the optical coupling block and which path extends over at least 90 degrees of the arc of the fiber.

9. The macrobend light launch unit according to claim 5 wherein said silicon gel layer is selected to have a refractive index that substantially matches that of the optical fiber.

10. A macrobend light detector unit for drawing a portion of the light traveling over an optical fiber and detecting said light at a predetermined wavelength, comprising an optical coupling block formed of a transparent solid material with a refractive index substantially the same as said fiber and having a detection portion with a substantially cylindrical concave surface; an anvil with a generally cylindrical surface biasing the fiber into an arc against the optical coupling block detection portion, and light detection means sensitive to said predetermined wavelength and in optical contact with said optical coupling block and having an optic axis oriented to intersect said arc to detect light leaking from said fiber into said optical coupling block thereby to detect the level of said light traveling through the fiber in one direction, wherein said optical coupling block further includes a clear silicon gel layer on said cylindrical concave surface.

11. The macrobend light detector unit according to claim 10, wherein said detection means includes first and second light detection elements each in contact with said optical coupling block and having optic axes respectively oriented to intersect said arc to detect the level of light traveling in first and second opposite directions in said fiber.

12. The macrobend light detector unit according to claim 10, wherein said light detection means receives light from a portion of contact of the arc of fiber with the optical coupler that extends for at least 90 degrees of arc.

13. The macrobend light detector unit according to claim 10 wherein said optical coupling block is formed of a clear plastic resin material.

14. The macrobend light detector unit according to claim 10 wherein said anvil includes a circumferential groove for accurately locating said fiber against the optical coupling block.

15. The macrobend light detector unit according to claim 10 wherein said silicon gel layer is selected to have a refractive index that substantially matches that of the optical fiber.

* * * * *